(12) United States Patent
Pfeil

(10) Patent No.: US 10,138,433 B2
(45) Date of Patent: Nov. 27, 2018

(54) METHOD AND APPARATUS FOR PURIFYING A MIXTURE COMPRISING OIL AND WAX

(71) Applicant: Sulzer Chemtech AG, Winterthur (CH)

(72) Inventor: Mathias Pfeil, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 15/579,456

(22) PCT Filed: Jun. 10, 2016

(86) PCT No.: PCT/EP2016/063307
§ 371 (c)(1),
(2) Date: Dec. 4, 2017

(87) PCT Pub. No.: WO2016/198605
PCT Pub. Date: Dec. 15, 2016

(65) Prior Publication Data
US 2018/0142169 A1    May 24, 2018

(30) Foreign Application Priority Data

Jun. 11, 2015    (EP) .................................... 15171598

(51) Int. Cl.
*C10G 73/06*        (2006.01)
*B01D 9/00*         (2006.01)
(Continued)

(52) U.S. Cl.
CPC ........... *C10G 73/12* (2013.01); *B01D 9/0013* (2013.01); *C10G 73/06* (2013.01); *C10G 73/10* (2013.01);
(Continued)

(58) Field of Classification Search
CPC ........ C10G 73/12; C10G 73/10; C10G 73/16; C10G 73/14; C10G 73/00; C10G 73/06; B01D 9/0013; B01D 2009/0086
See application file for complete search history.

(56) References Cited

U.S. PATENT DOCUMENTS 2,603,589 A    7/1952  Schaerer
2,915,450 A    12/1959 Olson
(Continued)

FOREIGN PATENT DOCUMENTS

WO    WO2014108285    *    7/2014

*Primary Examiner* — Randy Boyer
*Assistant Examiner* — Juan V Valencia
(74) *Attorney, Agent, or Firm* — Larson & Anderson, LLC

(57) ABSTRACT

The present invention relates to a method for fractionating a crude mixture comprising at least one oil and at least one wax, which comprises the following steps: (a) mixing the crude mixture with a solvent to obtain a crude solvent-mixture, (b) carrying out at least one crystallization stage with the solvent-mixture obtained in step (a) to prepare a first fraction containing dewaxed oil and a second fraction containing slack wax, (c) carrying out at least one crystallization stage with the second fraction obtained in step (b) in a layer crystallizer, wherein to the second fraction prior to the crystallization in step (c) no solvent or at most 100% by weight of solvent relative to the weight of the second fraction are added, to prepare a third fraction containing hard wax having an oil content of at most 1.5% by weight and a fourth fraction containing soft wax having an oil content of more than 1.5% by weight and (d) circulating at least a part of the fourth fraction into at least one of the at least one crystallization stage of step (b).

14 Claims, 1 Drawing Sheet

Figure 1:
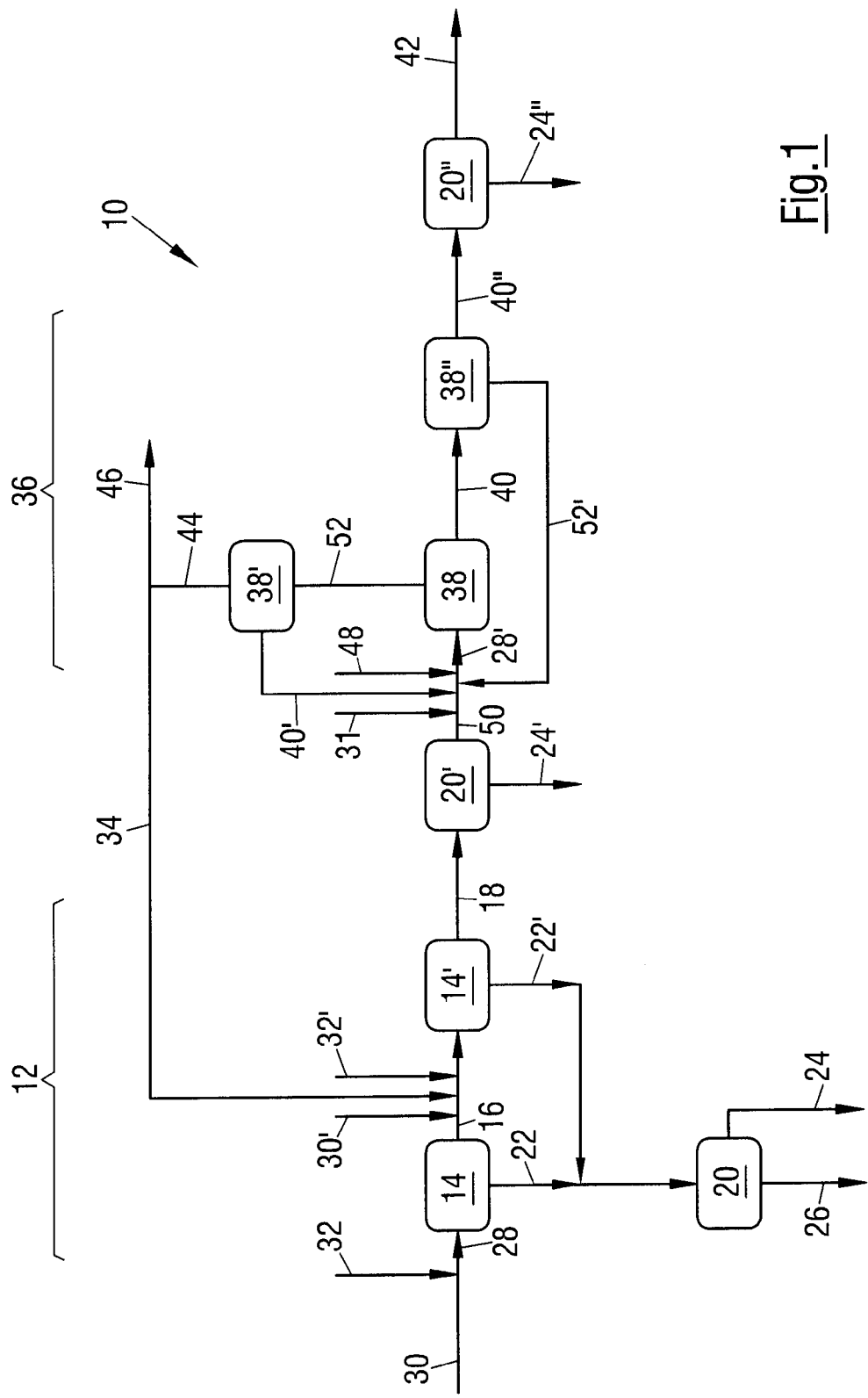

(51) Int. Cl.
*C10G 73/12* (2006.01)
*C10G 73/14* (2006.01)
*C10G 73/10* (2006.01)
*C10G 73/16* (2006.01)

(52) U.S. Cl.
CPC ............. *C10G 73/14* (2013.01); *C10G 73/16* (2013.01); *B01D 2009/0086* (2013.01)

(56) References Cited

U.S. PATENT DOCUMENTS

| | | | |
|---|---|---|---|
| 2,979,453 A | | 4/1961 | Kiersted et al. |
| 3,006,839 A | | 10/1961 | Arabian et al. |
| 6,074,548 A | * | 6/2000 | Matzat ................. B01D 9/0013 208/30 |
| 6,145,340 A | * | 11/2000 | Stepanski ............ B01D 9/0013 62/532 |

* cited by examiner

METHOD AND APPARATUS FOR PURIFYING A MIXTURE COMPRISING OIL AND WAX

The present invention relates to a method for fractionating a crude mixture comprising at least one oil and at least one wax, such as for fractionating a mineral or a synthetic oil contaminated with wax, such as contaminated with paraffin wax.

Oils, such as mineral oils, vegetable oils or synthetic oils prepared for instance by Fischer-Tropsch synthesis, are an important raw material in various industries in a plurality of applications and chemical processes. However, such oils are usually contaminated with a significant amount of waxes, which have to be removed, in order to improve the quality of the oil, such as in order to reduce its setting point. Oil is defined in this connection as a hydrocarbon, mainly as an alkanes including composition, which is liquid at ambient temperature, which has a kinematic viscosity at 100° C. of at most 7 cSt and which is highly soluble in methyl ethyl ketone. In contrast thereto, wax is defined in this connection as a hydrocarbon, mainly as an alkanes including composition, which is plastic at ambient temperature, which has a kinematic viscosity at 100° C. of 7 cSt or higher and which is not soluble in methyl ethyl ketone when determined in accordance with ASTM D721 or DIN 51531.

Several techniques are known for dewaxing crude oil being contaminated with wax. Namely, among others crystallization of the waxes from the oil fraction, selective dissolution of the oil fraction in a solvent, which does not dissolve the wax, and microbiological methods.

Crystallization based dewaxing processes have gained in importance during the last years, because they are suitable to dewax oil quite efficiently and with a quite low energy demand. Such crystallization based dewaxing processes can be roughly divided into two groups, namely into solvent-free crystallization methods and into crystallization methods making use of solvents.

The latter methods making use of solvents are useable for crude oils including all kind of waxes independent from their molecular weight and are typically performed by mixing the crude oil with a sufficiently high volume of solvent, such as methyl ethyl ketone, which dissolves the oil fraction, and by then cooling the mixture in a crystallizer so that the wax fraction crystallizes, which is then separated from the liquid solvent-oil phase. However, these methods are disadvantageous because they require the addition of a high volume of solvent, which has to be removed afterwards from the oil fraction, which makes the whole method energetically expensive and necessitates a complex plant.

In contrast thereto, the crude mixture is crystallized without addition of a solvent in the solvent-free crystallization methods. Such a process is for example described in EP 0 891 798 A1. However, such processes are only suitable for oils including exclusively waxes having a comparable short carbon chain length, so that it cannot be used for fractionating crude oil including waxes having a comparable long carbon chain length.

Moreover, a more severe disadvantage is that all these processes only achieve a comparable low yield.

In view of this, the object underlying the present invention is to provide a method for fractionating a crude mixture, which comprises at least one oil and at least one wax, wherein the method is also suitable to fractionate crude oil including waxes having a comparable long carbon chain length to a certain amount, and wherein the method separates the crude mixture—with a high yield—to an oil fraction and to a wax fraction, wherein both fractions have an excellent purity.

In accordance with the present invention, this object is satisfied by providing a method for fractionating a crude mixture comprising at least one oil and at least one wax, which comprises the following steps:
(a) mixing the crude mixture with a solvent to obtain a crude solvent-mixture,
(b) carrying out at least one crystallization stage with the solvent-mixture obtained in step (a) to prepare a first fraction containing dewaxed oil and a second fraction containing slack wax,
(c) carrying out at least one crystallization stage with the second fraction obtained in step (b) in a layer crystallizer, wherein to the second fraction prior to the crystallization in step (c) no solvent or at most 100% by weight of solvent relative to the weight of the second fraction are added, to prepare a third fraction containing hard wax having an oil content of at most 1.5% by weight and a fourth fraction containing soft wax having an oil content of more than 1.5% by weight and
(d) circulating at least a part of the fourth fraction into at least one of the at least one crystallization stage of step (b).

This solution bases on the surprising finding that by combining a solvent based dewaxing step (b) carried out in at least one crystallization stage and downstream thereof an at least essentially solvent-free deoiling step (c) carried out in at least one crystallization stage with the slack wax obtained in the dewaxing step (b), a very pure oil fraction and a very pure wax fraction are obtained in a comparable simple and energy-efficient method in a surprisingly high yield, when at least a part of the soft wax obtained in the deoiling step (c) is recirculated back into the dewaxing step (b). During the dewaxing step (b), the wax fraction crystallizes and is separated from the liquid solvent-oil mixture, which is then further processed by removing the solvent, e.g. by evaporation, to obtain a very pure oil fraction having an oil content of up to more than 99.5% by weight as first product. The wax fraction obtained during the dewaxing step (b) often contains significant amounts of solvent, for example, typically 30 to 70% by weight of the wax fraction. One skilled in the art will understand that it is generally be preferred to remove this solvent from the wax fraction in order to simplify further processing and minimize any environmental, health and safety issues. The wax fraction is then subjected to the solvent-free or at least essentially solvent-free deoiling step (c), in which a wax-rich, nearly solvent free hard wax fraction crystallizes and is thus obtained as second product. The non-crystallizing and the sweatened out soft wax fraction is at least partially and preferably mostly recirculated into the dewaxing step (b), in order to thus increase the total yield of the process, surprisingly without negatively affecting the quality of the two products. Advantageously, the method in accordance with the present invention requires only comparable low amounts of solvent based on the total amount of produced hard wax. A further particular advantage of this process is that it is in particular suitable to fractionate crude oil including up to 50% by weight of waxes having a comparable long carbon chain length based on the total weight of the waxes. All in all, the method in accordance with the present invention leads in a high yield to an oil fraction and to a wax fraction, wherein both fractions have an excellent purity.

The term slack wax denotes the crude wax fraction obtained after the dewaxing step (b). Slack wax comprising hydrocarbons having a comparable short carbon chain length is denoted as light slack wax and is defined in accordance with the present invention as slack wax having a kinematic viscosity of at most 7 cSt. In contrast thereto, slack wax comprising hydrocarbons having a comparable long carbon chain length is denoted as heavy slack wax and is defined in accordance with the present invention as slack wax having a kinematic viscosity of more than 7 cSt.

In addition, the term hard wax is defined in accordance with the present invention as wax having an oil content of at most 1.5% by weight, whereas the term soft wax is defined in accordance with the present invention as wax having an oil content of more than 1.5% by weight and typically of 20 to 30% by weight.

Finally, in accordance with the present invention a solvent-free crystallization step is one, in which no solvent is added to the mixture before introducing it into the crystallizer and in which the mixture introduced into the crystallizer does—apart from unavoidable impurities—not contain solvent and in particular not more than 1% by weight of solvent relative to the weight of the mixture. In contrast thereto, in accordance with the present invention an essentially solvent-free crystallization step is one, in which the mixture introduced into the crystallizer includes at most 100% by weight of solvent relative to the weight of the mixture, wherein the included solvent has been either intentionally added to the mixture and/or is contained in the mixture from an earlier process step.

In principle, any crude mixture including at least one oil and at least one wax can be used as starting mixture of the method in accordance with the present invention. Particular good results are in particular obtained, when the crude mixture comprises oil as main ingredient. Preferably, the crude mixture includes 60 to 99% by weight of oil and 1 to 40% by weight of wax, more preferably 75 to 98% by weight of oil and 2 to 25% by weight of wax and most preferably 85 to 95% by weight of oil and 5 to 15% by weight of wax.

However, the method in accordance with the present invention may also be performed with a crude mixture having a very poor quality. In this embodiment, the crude mixture preferably includes 5 to 50% by weight of oil and 50 to 95% by weight of wax, more preferably 10 to 40% by weight of oil and 60 to 90% by weight of wax and most preferably 15 to 35% by weight of oil and 65 to 85% by weight of wax.

As noted above, the method in accordance with the present invention is particularly suitable for processing crude oil mixtures including exclusively light wax as wax component or a mixture of light wax and up to 50% by weight of heavy wax based on the total weight of waxes included in the crude mixture.

Accordingly, it is preferred that the crude mixture includes, based on the total weight of wax, at least 50% by weight, more preferably at least 70% by weight, even more preferably at least 80% by weight, still more preferably at least 90% by weight and most preferably 100% by weight of light wax having a viscosity at 100° C. of at most 7 cSt.

In particular, the method in accordance with the present invention is particularly suitable to fractionate a cut of a waxy oil obtained from a distillation step in a distillation column as crude mixture. Apart from that, all known oils, particularly mineral oils, vegetable oils and synthetic oils prepared for instance by Fischer-Tropsch synthesis, which are contaminated with wax, may be used as crude mixture.

In step (a) of the method in accordance with the present invention, the crude mixture is mixed with a sufficiently high volume of a solvent, which is able to efficiently dissolve the oil component of the crude mixture at the operation temperature of step (a) and in particular also at the temperature, in which the wax component is crystallized in the crystallizer during step (b). Good results are in particular achieved with this regard, when the solvent is selected from the group consisting of methyl ethyl ketone, methyl isobutyl ketone, acetone, benzene, toluene, dichloromethane, dichloroethane, methylene dichloride, methanol, methyl tertiary butyl ether, N-methyl-pyrolidone and mixtures of two or more of the aforementioned solvents.

In a further development of the idea of the present invention, it is proposed to use in step (a) as solvent either a mixture of methyl ethyl ketone and toluene or a mixture of dichloroethane and methylene dichloride. These solvent mixtures particularly efficiently dissolve oil in particular at the temperature, in which the wax component is crystallized in the crystallizer during the later step (b).

Preferably, the crude mixture is mixed in step (a) with 100 to 1,000% by weight, more preferably with 200 to 900% by weight and most preferably with 300 to 800% by weight of solvent based on the total weight of the crude mixture.

In accordance with a particular preferred embodiment of the present invention, in the method step (b) at least one suspension crystallization stage is carried out. This is due to the fact that suspension crystallization allows to efficiently crystallize wax and to efficiently separate wax crystals from a solvent containing crude oil mixture with oil being the main ingredient.

Preferably, the suspension crystallization stage is performed in a suspension crystallizer comprising two blocks, namely one first block for producing the crystals and comprising at least one scraped surface crystallizer for removing the crystallization heat, and as a second block a separation device, in which the produced crystals are separated from the mother liquor. The second block may comprise a filter, a centrifuge or any other known separation device.

In principle, only one crystallization and preferably suspension crystallization step may be performed in method step (b). However, in order to increase the fractionation efficiency between the wax component and the oil component, it is proposed in a further development of the idea of the present invention, to perform in method step (b) two to five, more preferably two to four and even more preferably two crystallization stages and most preferably two suspension crystallization stages.

If the method step (b) comprises two or more crystallization stages, the at least part of the fourth fraction is preferably circulated into the second crystallization stage.

Preferably, the crystallization stages in method step (b) are carried out so that the first oil fraction obtained after the at least one crystallization stage comprises less than 5% by weight, preferably less than 3% by weight, more preferably less than 2% by weight, even more preferably less than 1% by weight and most preferably less than 0.5% by weight of wax. The more crystallization stages are performed, the more dewaxed oil can be separated and the lower is the oil concentration in the first wax fraction obtained after the final crystallization stage; however, the higher are the energy costs and the more complex is the required crystallization equipment. Due to this, a good compromise between both tendencies is obtained by performing in method step (b) two suspension crystallization stages. While in the first crystallization stage, depending on the composition of the crude mixture, at least 65% by weight or even at least 75% by weight of the oil in the crude mixture is separated, in the second crystallization stage at least 80% by weight of the remaining oil after the first crystallization stage is separated, so that the oil fraction after the second crystallization stage contains less than 1% by weight of wax and in particular less than 0.5% by weight of wax.

Moreover, it is preferred that the crystallization stages in method step (b) are carried out so that the second slack wax fraction obtained after the at least one crystallization stage comprises less than 20% by weight, preferably less than 15% by weight, more preferably less than 12% by weight and even more preferably less than 10% by weight of oil. The more crystallization stages are performed, the lower is the oil concentration in the second slack wax fraction obtained after the final crystallization stage; however, the higher are the energy costs and the more complex is the required crystallization equipment. Due to this, a good compromise between both tendencies is obtained by performing in method step (b) two suspension crystallization stages.

After the method step (b), the obtained oil-solvent mixture is further processed so as to remove the solvent. The solvent removal may be effected by any technique known to a person skilled in the art, such as by evaporation, to obtain a pure oil fraction as first product of the method. The final oil fraction has preferably an oil concentration of at least 99% by weight and more preferably of more than 99.5% by weight.

As set out above, the method in accordance with the present invention is particularly suitable for processing crude mixtures including exclusively light wax as wax component. However, it may be also used for processing a crude mixture including, based on the total weight of the wax included in the crude mixture, 50% by weight of a light wax having a viscosity at 100° C. of at most 7 cSt and up to 50% by weight of a heavy wax having a viscosity at 100° C. of more than 7 cSt. If, as preferred, the crude mixture exclusively includes light wax as wax component, the deoiling step (c) is preferably preformed solvent-free, i.e. without adding any solvent to the slack wax obtained in step (b). However, if the crude mixture comprises a mixture of light wax and heavy wax, depending on the precise formulation of the slack wax a small amount of a solvent may be added to the slack wax, in order to improve the efficiency of the deoiling step (c). However, if solvent is added, the solvent is added in an amount that the solvent content of the slack wax mixture introduced into the crystallization stage of step (c) is, relative to the weight of the second fraction, at most 100% by weight, preferably at most 80% by weight, more preferably at most 50% by weight and even more preferably at most 20% by weight. If a solvent is added, the solvent is preferably selected from the group consisting of methyl ethyl ketone, methyl isobutyl ketone, acetone, benzene, toluene, dichloromethane, dichloroethane, methylene dichloride, methanol, methyl tertiary butyl ether, N-methylpyrolidone and arbitrary mixtures of two or more of the aforementioned solvents.

However, as set out above, most preferably no solvent at all is added to the second slack wax fraction obtained in step (b) prior to the crystallization in step (c).

Optional, if necessary the slack wax fraction may be heated to a temperature above 37° C., preferably to a temperature between 40 and 70° C. before introducing it to the first of the at least one crystallization step (c), in order to melt the wax crystals.

In accordance with a particular preferred embodiment of the present invention, in the method step (c) at least one static crystallization stage is carried out. This is due to the fact that static crystallization allows to efficiently crystallize hard wax and to efficiently separate hard wax crystals from the oil containing soft wax fraction. In contrast to for example dynamic crystallization, static crystallization is suitable for crystallizing comparable highly viscous liquids, such as solvent-free slack wax mixtures. Furthermore, static crystallization has the advantage of high flexibility, of wide operating range, of easy operation since there is no crystal slurry handling and no filtration, of high reliability and of low operation costs due to the lack of moving parts. In a static crystallizer, the crystallizer is filled with mother liquid, which contacts cooled crystallization plates, which hang in vertical direction in the crystallizer. An essential feature of static crystallization is that the mother liquid is not stirred or otherwise agitated during the crystallization.

In order to improve the separation effect and its efficiency, after the static crystallization stage, when the mother liquid is removed from the static crystallizer, the crystal layers deposited on the cooled plates may be further purified by sweating, i.e. by partially melting the crystals by gently heating the crystals close to their melting point. This effects that impurities trapped in and adhered to the crystal layers will be removed from the crystals.

In principle, only one layer crystallization and preferably static crystallization step may be performed in method step (c). However, in order to increase the fractionation effect and its efficiency between the oil-free hard wax component and the oil containing soft wax component, it is proposed in a further development of the idea of the present invention, to perform in method step (c) two to five, more preferably two to four and even more preferably three layer crystallization stages, preferably static crystallization stages, and most preferably three static crystallization stages.

Preferably, the crystallization stages in method step (c) are carried out so that the third hard wax fraction obtained after the last crystallization stage comprises less than 1.5% by weight, preferably less than 1% by weight, more preferably less than 0.5% by weight and most preferably less than 0.1% by weight of oil. The more crystallization stages are performed, the lower is the oil concentration in the third hard wax fraction obtained after the final crystallization stage and/or the higher the yield of hard wax in method step (c); however, the higher are the energy costs and the more complex is the required crystallization equipment. Due to this, a good compromise between both tendencies is obtained by performing in method step (c) three static crystallization stages. While in the first crystallization stage, depending on the composition of the crude mixture, at least 70% by weight of the included oil are separated, in the second crystallization stage at least 99% by weight of the remaining oil are separated, so that the hard wax fraction after the second crystallization stage contains less than 1% by weight of wax, in particular less than 0.5% by weight of oil or even less than 0.1% by weight of oil. In contrast thereto, the fourth soft wax fraction contains more than 1.5% by weight, typically more than 5% by weight, even more typically more than 10% by weight and in particular 20 to 30% by weight of oil.

An essential feature of the method in accordance with the present invention is that in method step (d) at least a part of the fourth soft wax fraction is circulated back to the dewaxing step (b), in order to increase the yield of the process, surprisingly without negatively affecting the purity of the both obtained products, namely of the dewaxed oil fraction and of the hard wax fraction. Good results are in particular obtained with this regard, when in step (d) 10 to 100%, more preferably 20 to 90% and most preferably 40 to 80% of the fourth soft wax fraction are circulated into the at least one (dewaxing) crystallization stage of step (b).

In addition, the present invention relates to a plant for fractionating a crude mixture comprising at least one oil and at least one wax, in particular for carrying out a method as described above, wherein the plant comprises:

i) a source of a crude mixture,
ii) a first crystallization section comprising two to ten suspension crystallizers,
iii) a second crystallization section comprising at least one crystallizer, preferably static crystallizer and
iv) a circulation line connecting the outlet of the at least one layer crystallizer iii) and an inlet of the at least one suspension crystallizer ii), wherein the circulation line is adapted to return at least a part of the fourth fraction into the at least one suspension crystallizer ii).

Preferably, the circulation line connects the outlet of the at least one layer crystallizer iii) directly, i.e. without any further device there between, with the inlet of the at least one suspension crystallizer ii).

In typical embodiments of the plant, the source of the crude mixture is a storage or buffer tank or tanks, preferably filled with the crude mixture to be fractionated. In several preferred embodiments of the plant, the tank(s) are in fluid connection with one or more oil or wax processing units, such as extraction and/or distillation units.

In one specific embodiment, the oil or wax processing unit is part of a petrochemical refinery. In other less preferred embodiments of the plant, the tank(s) are in indirect fluid communication with the oil or wax processing units by means of intermediate transport vessels such as a tanker or railway or truck tank.

In accordance with a particular preferred embodiment of the present invention, the first crystallization section ii) of the plant comprises two to five suspension crystallizers.

Moreover, it is preferred that the second crystallization section iii) of the plant comprises one to thirty, preferably two to ten and more preferably two to five layer crystallizers, preferably static crystallizers.

If required, the first crystallization section of the plant may comprise a line for feeding solvent into the at least one suspension crystallizer.

If required, the second crystallization section of the plant may comprise a line for feeding solvent into the at least one layer crystallizer.

Specific embodiments in accordance with the present invention are now described with reference to the appended drawings and by an example.

FIG. 1 schematically shows an embodiment of a plant for conducting the method for fractionating a crude mixture comprising at least one oil and at least one wax in accordance with an embodiment of the present invention.

FIG. 1 shows a plant 10 for conducting the method for fractionating a crude mixture comprising at least one oil and at least one wax in accordance with an embodiment of the present invention. The plant 10 includes a first crystallization section 12 comprising two suspension crystallizers 14, 14', which are in fluid communication with each other via line 16. While the first suspension crystallizer 14 comprises a slack wax removal line 16, the second suspension crystallizer 14' comprises a slack wax removal line 18.

Downstream of both suspension crystallizers 14 and 14', an evaporator 20 is arranged, which is connected with the suspension crystallizers 14 and 14' via lines 22 and 22'. The evaporator 20 comprises a solvent removal line 24 as well as an oil product removal line 26.

The inlet of the first suspension crystallizer 14 is in fluid communication with a feed line 28, which is in fluid communication with an inlet line for crude mixture 30 and an inlet line for solvent 32.

The inlet of the second suspension crystallizer 14' is in fluid communication with the slack wax removal line 16, which is in fluid communication with an inlet line for crude mixture 30', an inlet line for solvent 32' and the circulation line 34.

It is noted that the crude feed inlet line 30' and the below described slack wax inlet line 31 are optional, and it is preferable, if possible to feed streams having higher wax content and lower oil content to crystallizer located progressively downstream in the plant.

Downstream of the second suspension crystallizer 14', a second evaporator 20' is arranged, which is connected with the suspension crystallizer 14' via the slack wax removal line 18. The evaporator 20' comprises a solvent removal line 24' as well as a slack wax removal line 50.

Moreover, the plant 10 comprises a second crystallization section 36 comprising three layer crystallizers, preferably static crystallizers 38, 38', 38" which are in fluid communication with each other via lines 40 and 40' for deoiled wax and via lines 52 and 52' for soft wax. The first static crystallizer 38 comprises a deoiled wax removal line 40 leading to third crystallizer 38" and a soft wax removal line 52 leading to the second crystallizer 38'. The second static crystallizer 38' comprises a deoiled wax removal line 40', which leads to the first crystallizer 38 and a soft wax outlet line 44. The third crystallizer 38" comprises a hard wax removal line 40" and a soft wax removal line 52' leading to the first crystallizer 38.

The hard wax removal line 40" from the third crystallizer 38" leads to a third evaporator 20". The third evaporator 20" comprises a solvent removal line 24" as well as a hard wax removal line 42.

In the case of solvent free deoiling (embodiment not shown in the FIGURE), the line 40" and the third evaporator 20" are not necessary, and instead the hard wax would be directly removed from the third crystallizer 38" in that embodiment by means of line 42.

The soft wax outlet line 44 of the second static crystallizer 38 splits into a soft wax removal line 46 and the circulation line 34, which leads into the slack wax removal line 16.

In operation, a crude mixture comprising at least one oil and at least one wax, as well as solvent are fed through line 28 into the first suspension crystallizer 14. While a solvent-wax rich fraction crystallizes on the scraped cooled surface of the first suspension crystallizer 14, the solvent-oil rich fraction not crystallizing is withdrawn from the first suspension crystallizer 14 via line 22 and is fed into the evaporator 20. The solvent-wax rich fraction including all crystallized wax from the first suspension crystallizer 14 is separated from solvent-oil fraction, is at least partially molten and is fed into slack wax removal line 16.

The at least partially molten solvent-wax rich fraction from crystallizer 14 via slack wax removal line 16, solvent via line 32', crude mixture via line 30' and the part of soft wax fraction recirculated via line 34 are all fed together into the second suspension crystallizer 14'. Again, a solvent-wax rich fraction crystallizes on the scraped cooled surface of the second suspension crystallizer 14', whereas the solvent-oil rich fraction not crystallizing is withdrawn from the second suspension crystallizer 14' and is introduced into the evaporator 20 via line 22'. In the evaporator 20, the mixture is heated so as to evaporate the solvent included in the solvent-oil fraction, wherein via the solvent removal line 24 separated solvent is drawn off and the purified oil fraction with an oil content of more than 99.5% by weight is drawn off via the oil product removal line 26.

The solvent-wax rich fraction from the second suspension crystallizer 14' including all crystallized wax is separated from solvent-oil fraction, at least partially molten and fed into the slack wax removal line 18 and introduced into the evaporator 20'. In the evaporator 20', the mixture is heated so as to evaporate the solvent included in the solvent-wax rich fraction, wherein via the solvent removal line 24' separated solvent is drawn off and the pre-purified wax fraction, now called slack wax, is drawn off via line 50 to the second crystallization section 36.

Optionally, a further solvent inlet line 48 leading to line 50 is provided and allows to add solvent to the slack wax rich fraction led to the first layer crystallizer 38, preferably static crystallizer 38 of the second crystallization section 36. Furthermore, optionally a further slack wax inlet line 31 leading to line 50 is provided and allows to add slack wax having a reasonable less oil content than the crude mixture streams added via lines 30 and/or 30' before, to the slack wax rich fraction led to the first layer crystallizer, preferably static crystallizer 38 of the second crystallization section 36. In the first static crystallizer 38, oil-free or at least essentially oil-free hard wax crystallizes, whereas oil-rich soft wax remains liquid or becomes liquid by sweating the crystallized fraction.

The oil-rich soft wax is drawn off from the first static crystallizer 38 and conducted into the second static crystallizer 38' via line 52. At least essentially oil-free hard wax crystallizes in the second static crystallizer 38', whereas oil-rich soft wax remains liquid or becomes liquid by sweating and is drawn off from the second static crystallizer 38' via the soft wax outlet line 44. While a part of the soft wax fraction is removed from the plant via line 46, the remaining part of the soft wax fraction is recirculated into the second suspension crystallizer 14' via circulation line 34.

The crystallized hard wax fraction in the first static crystallizer 38 is heated up, molten and fed via line 40 to the third static crystallizer 38". The crystallized hard wax fraction in the second static crystallizer 38' is heated up, molten and fed via line 40' and 28' to the first static crystallizer 38.

In case solvent has been added to the slack wax in line 28' via line 48, the remolten hard wax-solvent mixture from third static crystallizer 38" is fed via line 40" into the evaporator 20". In the evaporator 20", the mixture is heated so as to evaporate the solvent from the hard wax, whereas via the solvent removal line 24" separated solvent is drawn off and the deoiled hard wax fraction is drawn off from the plant via line 42.

In case no solvent has been added to the slack wax in line 28' via line 48 (embodiment not shown), the molten hard wax from the third static crystallizer 38" is drawn off from the plant via line 42.

Subsequently, the present invention is illustrated by means of an example, which, however, does not delimit the present invention.

EXAMPLE

Unless stated otherwise, all parts and percentages are by weight.

Three different soft wax samples originating from a solvent-free crystallization stage and having an oil content of more than 1.5% by weight were processed in a plant as shown in FIG. 1. More specifically, the three different soft wax samples were mixed with a mixture of methylethylketone and toluene as solvent and circulated into a suspension crystallization stage to prepare a first fraction containing dewaxed oil and a second fraction containing slack wax. The slack waxes obtained had a 2 to 4 times lower oil content than the soft wax, as shown in the following table.

|           | #1 Oil content | #2 Oil content | #3 Oil content |
|-----------|----------------|----------------|----------------|
| Soft wax  | 27.4           | 38.2           | 14.5           |
| Slack wax | 7.7            | 14.5           | 4.8            |

Afterwards, the obtained slack waxes were processed in a further crystallization stage, to prepare a hard wax fraction and a soft wax fraction.

REFERENCE NUMERAL LIST

10 Plant
12 First suspension crystallization section
14, 14' Suspension crystallizers
16 Slack wax removal Line
18 Slack wax removal line
20, 20', 20" Evaporator
22, 22' Line
24, 24', 24" Solvent removal line
26 Oil product removal line
28, 28' Feed line into a crystallization section
30, 30' Inlet line for crude mixture
31 Inlet line for slack wax
32, 32' Inlet line for solvent
34 Circulation line
36 Second crystallization section
38, 38', 38" Layer crystallizer, preferably static crystallizer
40, 40', 40" Deoiled wax removal line
42 Hard wax removal line
44 Soft wax outlet line of the second layer crystallizer
46 Soft wax removal line
48 Further solvent inlet line
50 Slack wax removal line
52, 52' Line for soft wax

The invention claimed is:

1. A method for fractionating a crude mixture comprising at least one oil and at least one wax, which comprises the following steps:
    (a) mixing the crude mixture with a solvent to obtain a crude solvent-mixture,
    (b) carrying out at least one crystallization stage with the solvent-mixture obtained in step (a) to prepare a first fraction containing dewaxed oil and a second fraction containing slack wax,
    (c) carrying out at least one crystallization stage with the second fraction obtained in step (b) in a layer crystallizer, wherein to the second fraction prior to the crystallization in step (c) no solvent or at most 100% by weight of solvent relative to the weight of the second fraction are added, to prepare a third fraction containing hard wax having an oil content of at most 1.5% by weight and a fourth fraction containing soft wax having an oil content of more than 1.5% by weight and
    (d) circulating at least a part of the fourth fraction into at least one of the at least one crystallization stage of step (b).

2. The method in accordance with claim 1, wherein the crude mixture includes 60 to 99% by weight of oil and 1 to 40% by weight of wax.

3. The method in accordance with claim 1, wherein the crude mixture includes, based on the total weight of wax, at least 50% by weight of light wax having a viscosity at 100° C. of at most 7 cSt.

4. The method in accordance with claim 1, wherein the crude mixture is mixed in step (a) with a solvent selected from the group consisting of methyl ethyl ketone, methyl isobutyl ketone, acetone, benzene, toluene, dichloromethane, dichloroethane, methylene dichloride, methanol, methyl tertiary butyl ether, N-methyl-pyrolidone and mixtures of two or more of the aforementioned solvents.

5. The method in accordance with claim 4, wherein the solvent is a mixture of methyl ethyl ketone and toluene or a mixture of dichloroethane and methylene dichloride.

6. The method in accordance with claim 1, wherein in step (b) at least one suspension crystallization stage is carried out.

7. The method in accordance with claim 1, wherein in step (b) one to five crystallization stages are carried out.

8. The method in accordance with claim 1, wherein to the second fraction obtained in step (b), prior to the crystallization in step (c), at most 100% by weight of solvent relative to the weight of the second fraction is added.

9. The method in accordance with claim 1, wherein in step (c) at least one static crystallization stage is carried out.

10. The method in accordance with claim 1, wherein in step (c) one to five crystallization stages are carried out.

11. The method in accordance with claim 1, wherein in step (d) 10 to 100% of the fourth fraction are circulated into the at least one crystallization stage of step (b).

12. A plant for fractionating a crude mixture comprising at least one oil and at least one wax, in particular for carrying out a method in accordance with claim 1, wherein the plant comprises:
  i) a source of a crude mixture,
  ii) a first crystallization section comprising two to ten suspension crystallizers,
  iii) a second crystallization section comprising at least one layer crystallizer, and
  iv) a circulation line connecting the outlet of the at least one layer crystallizer iii) and an inlet of the at least one suspension crystallizer ii).

13. The plant in accordance with claim 12, wherein the first crystallization section ii) comprises two to five suspension crystallizers, and the second crystallization section iii) comprises one to thirty layer crystallizers.

14. The plant in accordance with claim 12, wherein the first crystallization section comprises a line for feeding solvent into the at least one suspension crystallizer.

* * * * *